(12) United States Patent
Peng et al.

(10) Patent No.: US 9,201,178 B2
(45) Date of Patent: Dec. 1, 2015

(54) MULTI-SECTIONAL PARABOLIC COLLIMATING MIRROR

(71) Applicant: Seagate Technology LLC, Cupertino, CA (US)

(72) Inventors: Chubing Peng, Eden Prairie, MN (US); Kaizhong Gao, Shoreview, MN (US); Frank Edgar Stageberg, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 346 days.

(21) Appl. No.: 13/797,797

(22) Filed: Mar. 12, 2013

(65) Prior Publication Data

US 2013/0279035 A1    Oct. 24, 2013

Related U.S. Application Data

(60) Provisional application No. 61/637,633, filed on Apr. 24, 2012, provisional application No. 61/638,472, filed on Apr. 25, 2012.

(51) Int. Cl.
| | |
|---|---|
| *G02B 5/10* | (2006.01) |
| *G02B 19/00* | (2006.01) |
| *G11B 5/10* | (2006.01) |
| *G11B 5/31* | (2006.01) |
| *G11B 5/00* | (2006.01) |

(52) U.S. Cl.
CPC .............. *G02B 5/10* (2013.01); *G02B 19/0023* (2013.01); *G02B 19/0052* (2013.01); *G11B 5/102* (2013.01); *G11B 5/314* (2013.01); *G11B 2005/0021* (2013.01)

(58) Field of Classification Search
CPC .......... G02B 5/10; G02B 5/0808; G02B 5/09; G02B 5/32; G02B 6/26; G02B 6/34; G11B 2005/0021; G11B 5/102; G11B 5/314
USPC ................................ 359/853, 851; 369/13.33
See application file for complete search history.

(56) References Cited

U.S. PATENT DOCUMENTS

| | | |
|---|---|---|
| 2009/0074358 A1 | 3/2009 | Itagi et al. |
| 2011/0075420 A1 | 3/2011 | Van Gorkom et al. |
| 2011/0103201 A1 | 5/2011 | Peng et al. |
| 2011/0228651 A1* | 9/2011 | Gage ...................... G11B 5/314 369/13.24 |
| 2012/0201107 A1 | 8/2012 | Peng et al. |

* cited by examiner

*Primary Examiner* — Euncha Cherry
(74) *Attorney, Agent, or Firm* — Hollingsworth Davis, LLC (57) ABSTRACT

A planar collimator has first and second sections each intersecting at a junction between a first axis and a second axis normal to the first axis. Each of the first and second sections have geometries configured to receive light from a source point located on the first axis and collimate the light at respective positive and negative tilting angles relative to the second axis. The first and second sections direct the collimated light to respective first and second sides of a focusing mirror and away from a gap between the first and second sides of the focusing mirror.

20 Claims, 8 Drawing Sheets

MULTI-SECTIONAL PARABOLIC COLLIMATING MIRROR

RELATED PATENT DOCUMENTS

This application claims the benefit of Provisional Patent Application Ser. No. 61/637,633 filed on Apr. 24, 2012 and Provisional Patent Application Ser. No. 61/638,472 filed on Apr. 25, 2012, to which priority is claimed pursuant to 35 U.S.C. §119(e) and which are hereby incorporated herein by reference in their entireties.

SUMMARY

One embodiment described herein is directed to a planar collimator has first and second sections each intersecting at a junction between a first axis and a second axis normal to the first axis. Each of the first and second sections have geometries configured to receive light from a source point located on the first axis and collimate the light at respective positive and negative tilting angles relative to the second axis to respective first and second sides of a focusing mirror and away from a gap between the first and second sides of the focusing mirror.

In another embodiment, a method involves orienting a collimator to receive light from a source point located on a first axis and collimate the light at respective positive and negative tilting angles relative to a second axis normal to the first axis. A focusing mirror is oriented along the second axis to receive the collimated light at first and second sides of the focusing mirror. The focusing mirror has a gap between the first and second sides, and the collimated light is not received in the gap. The method further involves launching the light from the source point to the collimator to collimate and reflect the light to the focusing mirror. The focusing mirror directs the collimated light to a near field transducer at a focal region of the focusing mirror.

In another embodiment, an apparatus includes a diagonal mirror configured to receive light from a source point located on a first axis. The diagonal mirror includes non-parallel, first and second mirror portions joined by a split region that is parallel with the first axis. The split region introduces a phase shift between first and second portions of light reflected by the first and second portions. The apparatus includes a parabolic mirror having first and second sections configured to receive the respective first and second portions of light and direct the light to a focal region. The first and second portions are non-symmetrically disposed relative to the focal region to adjust the phase shift introduced by split region of the diagonal mirror.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

In heat-assisted magnetic recording (HAMR), also sometimes referred to as thermal-assisted magnetic recording (TAMR), information bits are recorded in a storage layer at elevated temperatures and the heating area in the storage layer determines the data bit dimension. A HAMR device utilizes a magnetic recording media (e.g., hard drive disk) that is able to overcome superparamagnetic effects that limit the areal data density of typical magnetic media. In order to record on this media, a HAMR device may use integrated optics as described above to heat a magnetic recording media (e.g., hard disk) in order to overcome superparamagnetic effects that limit the areal data density of typical magnetic media. In order to record on this media, a small portion of the media (e.g., a hotspot) is locally heated above the Curie temperature while being written to by a magnetic write head.

In order to achieve desired data density, the HAMR media hotspot may need to be smaller than a half-wavelength of light. However, due to what is known as the diffraction limit, optical components cannot focus the light at this scale. One way to achieve tiny confined hot spots is to use an optical near-field transducer, such as a plasmonic optical antenna or an aperture-integrated in an optical waveguide of high contrast in the index of refractive index between the waveguide core and its claddings. Light propagating in the waveguide is focused by an optical focusing element, such as a planar solid immersion mirror into an optical near-field transducer. This causes surface plasmon excitation at the NFT. Due to the shape of the NFT, this excitation can be used for direct a narrow beam of energy to the media surface.

In such an approach, one of challenges encountered is to launch light into the waveguide in a slider with low cost, insensitivity to variations in wavelength, good alignment tolerance, and good light delivery efficiency. In one arrangement, light can be launched into a slider from free space by a grating coupler fabricated in a slider, called free space light delivery. Another way to launch light into a slider is to place a laser light source, such as a laser diode, into or onto a slider. This may be referred to as laser-in-slider light delivery (or laser-on-slider light delivery). Instead of using a grating, an output facet of the laser may be butted up against an input facet of a waveguide that delivers light to the media surface.

Figure 1:
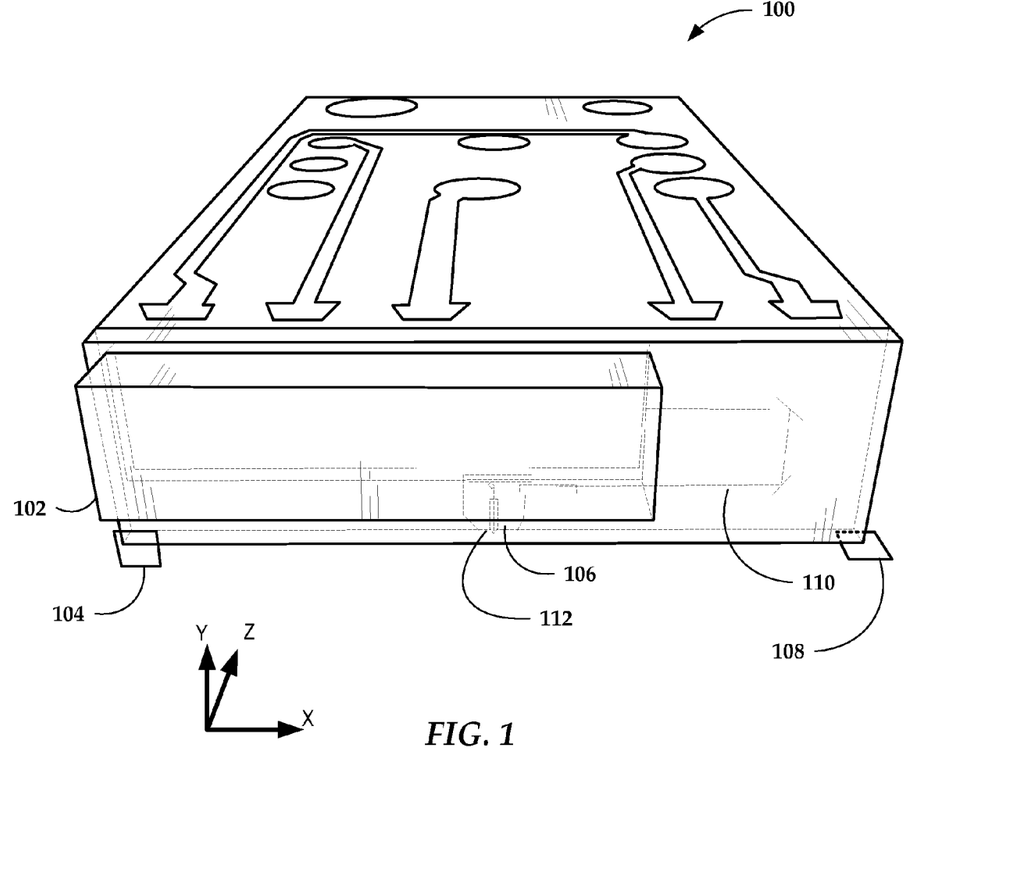
FIG. 1 is a perspective view of a slider according to an example embodiment.

In reference now to FIG. 1, a perspective view shows a HAMR slider 100 that may be used in a disk drive apparatus according to an example embodiment. This example slider 100 includes an edge-emitting laser diode 102 integrated into a trailing edge surface 104 of the slider 100. The laser diode 102 is proximate to a HAMR read/write head 106, the read/write head 106 having an edge on an air bearing surface (ABS) 108 of the slider 100. The ABS 108 faces and is held proximate to a moving media surface (not shown) during device operation.

The laser diode 102 provides electromagnetic energy to heat the media surface at a point near to the read/write head 106. Optical coupling components, such as a waveguide 110, are formed integrally within the slider device 100 to deliver light from the laser 102 to the media. For example, a waveguide and near-field transducer (NFT) 112 may be located proximate the read/write head 106 to provide local heating of the media during write operations. While the laser diode 102 in this example is an integral, edge firing device, it will be appreciated that the waveguide/NFT 112 may be applicable to any light source and light delivery mechanisms. For example, surface emitting lasers (SEL) may be used instead of edge firing lasers, and the slider may use any combination of integrated and external lasers. For example, it may be possible to form some or all parts of a laser integrally (e.g., in the layer deposition processes) within the slider 102.

Figure 2A:
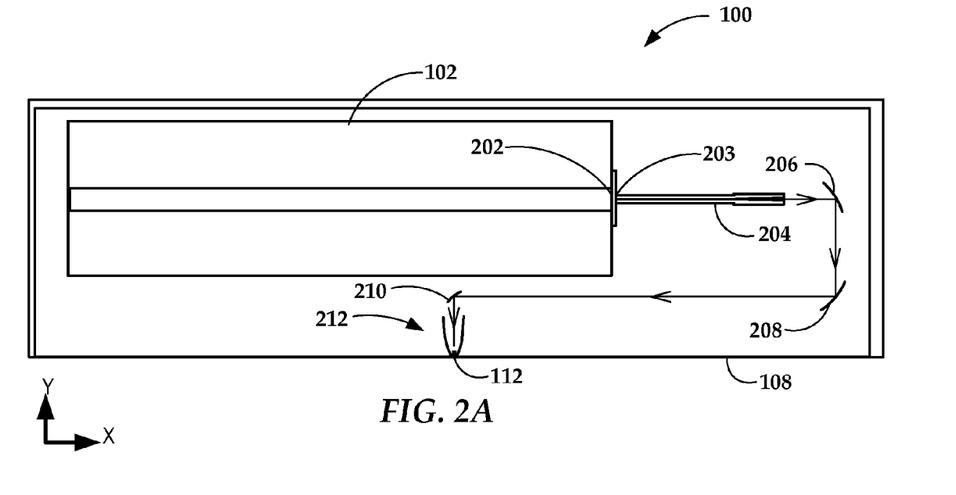
FIGS. 2A and 2B are views of trailing edge of sliders showing optical paths according to example embodiments.
Figure 2B:
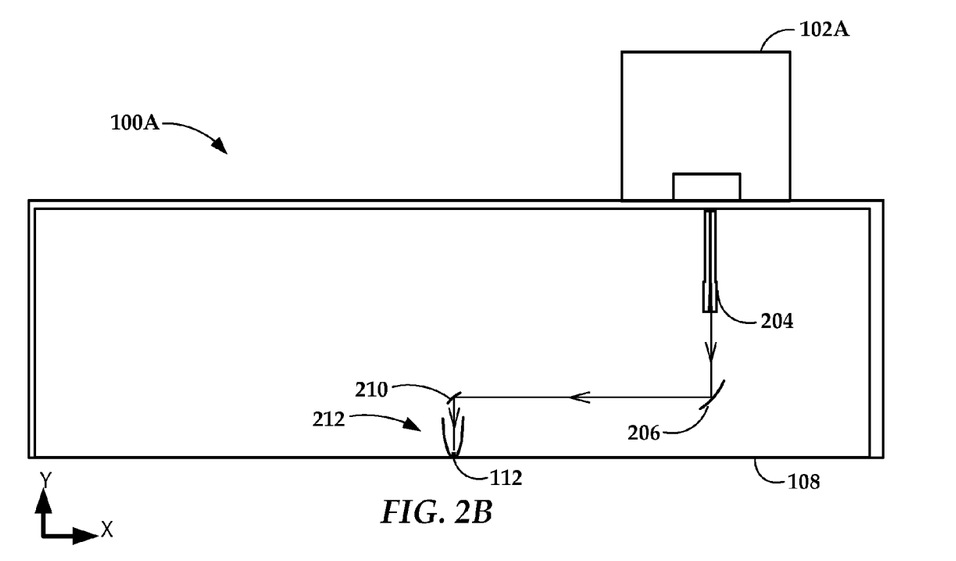

In reference now to FIGS. 2A and 2B, block diagrams illustrate example slider-integrated optical pathways according to example embodiments. In FIG. 2A, slider 100 of FIG. 1 is viewed from the trailing edge on the xy-plane. An output facet 202 of the laser 102 is coupled to an input facet 203 of a tapered waveguide input coupler 204 (e.g., by butting the facet of the laser 102 to a facet of the coupler 204). The waveguide input coupler 204 and other components described below may be formed on a common substrate plane that includes the NFT 112 located proximate the ABS 108.

The waveguide input coupler 204 delivers the light to a first mirror 206 which is configured as a planar parabolic collimator. In this context, the term "planar" refers to the collimator 206 being configured to reflect light within a planar layer of the slider 100. Collimated light from the first mirror 206 is reflected to a second mirror 208. The second mirror 208 is configured as a planar elliptical relay mirror, which directs light to a third mirror 210, which is configured as a second parabolic collimator. The collimated light of the third mirror 210 is directed to a solid immersion focusing mirror 212, which focuses the light on NFT 112.

In FIG. 2B, the light delivery path from laser 102A through slider 100A uses a waveguide coupler 204, first and second parabolic collimating mirrors 206, 210, and solid immersion mirror (SIM) 212. While these optical components 204, 206, 208, 210, 212 have the same reference numerals as in FIG. 1A, it will be appreciated that this indicates generally analogous functionality, but does not necessarily imply identical structures, materials, sizes, configurations, etc. The actual configuration of these and other components may differ between different slider designs 100, 100A depending on a number of factors, such as laser characteristics (power, wavelength, coupling efficiency, etc.), source-to-NFT path length, energy required to heat the media, etc. Nonetheless, the general concepts described hereinbelow may be equally applicable to these and other slider configurations.

Figure 3A:
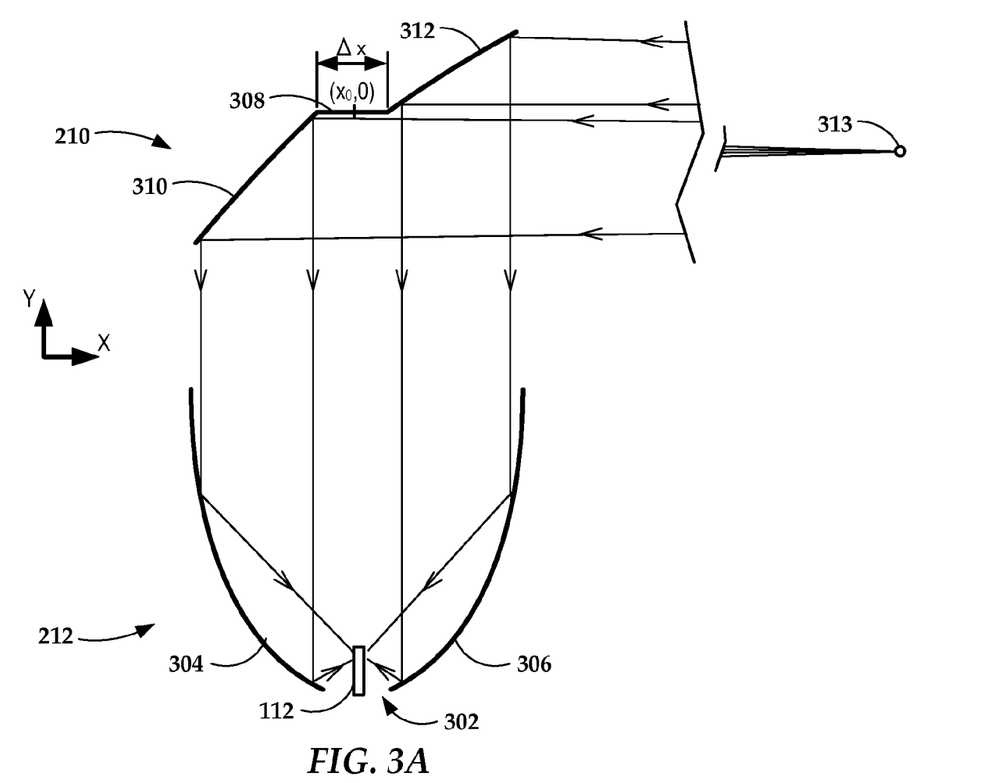
FIGS. 3A and 3B are diagrams of collimating mirrors according to example embodiments.

In referenced now to FIG. 3A, a diagram illustrates geometric details of a co-planar collimating mirror 210 and solid immersion mirror 212 according to an example embodiment. As seen in this diagram, the solid immersion mirror 212 includes a gap 302 between first and second sides 304, 306 of the mirror 212. The gap 302 facilitates location of the NFT 112 at a focal point for receiving light reflecting off of the sides 304, 306 of the mirror 212. The NFT 112 may be formed from plasmonic materials (e.g., gold, silver, ZrN, TiN, etc.) and may have a shape (e.g., disk/peg, side-by-side plates with a dielectric gap therebetween) that causes surface plasmons to be generated and directed to the media in response to the energy received from the mirror 212.

Light reflected from the collimating mirror 210 into the gap region 302 may be lost, resulting in a reduction in the overall system efficiency. One way of avoiding reflecting light from the mirror 210 into the gap 302 is to form the mirror 210 as first and second parabolic portions 310, 312 coupled via a split 308. The split 308 is oriented in a direction parallel to the x-axis, which in this diagram is the direction along which light is delivered to the mirror 210 from a source location 313 (e.g., elliptical mirror 208 in FIG. 2A). Accordingly, light delivered to the mirror 210 along the x-axis will be reflected only by first and second parabolic portions 310, 312. The first and second portions 310, 312 are arranged to collimate light and send light to first and second sides 304, 306 of solid immersion mirror 212. Because there is no reflection off of the split portion 308, no light is directed into the gap 302.

The dimension of the split 308 along the x-direction ($\Delta x$) is approximately equal to the x-dimension ($W_b$) of the solid immersion mirror gap 302, and may be selected based on Equation 1 below. In Equation 1, $\lambda_0$ denotes the light wavelength in free space, $n_{\mathit{eff}}$ is the effective waveguide mode index, m is an integer, and $\Delta m_0 < 1$ is chosen to accommodate certain requirement for setting the phase shift in the wavefront. For example, it may be desired to shift the phase of the light directed to first side 304 of focusing mirror 212 relative to the second side 306.

$$\Delta x = (m + \Delta m_0)\frac{\lambda_0}{n_{\mathit{eff}}} \approx W_b \qquad [1]$$

In Equation 1, any variation in the light wavelength will be magnified by m times in the phase. For instance, if $\lambda_0$=830 nm, $W_b$=6000 nm, $n_{\mathit{eff}}$=1.78, $\Delta x$=500 nm for a $\pi$ phase shift wavefront, this results in m=12. In this case, the performance of the mirror 210 is highly dependent on the wavelength $\lambda_0$ of the light. While the system is designed to operate at a nominal wavelength, e.g., 830 nm, temperature change can cause the wavelength to shift by some value $\Delta\lambda$. If, for example, $\Delta\lambda$=20 nm then the wavelength of light will be 850 nm and m$\Delta\lambda$=240 nm. This yields an extra phase shift of 0.58 $\pi$. This amount of extra phase is not desirable for some NFT designs. In one example, 0.1 $\pi$ of phase shift is the upper limit for desired NFT performance.

Accordingly, it may be possible to minimize the amount of split, $\Delta x$, by setting m=0. If $\Delta x$=0, the values of m and $\Delta m_0$ in Equation 1 are zero such that light delivery via mirror 210 is substantially achromatic. However, in order to achieve desired NFT performance, some phase shifting will be needed between the two mirror sections, such that m=0 and $\Delta m_0 \ne 0$, However, setting m=0 will result in light being directed into the gap 302, which reduces efficiency. As will be shown below, one way to avoid light being directed into the gap is to cant/tilt parts of the collimator 210 and shape the two sides 310 and 312 such that light will not be directed into the gap 302.

Figure 3B:
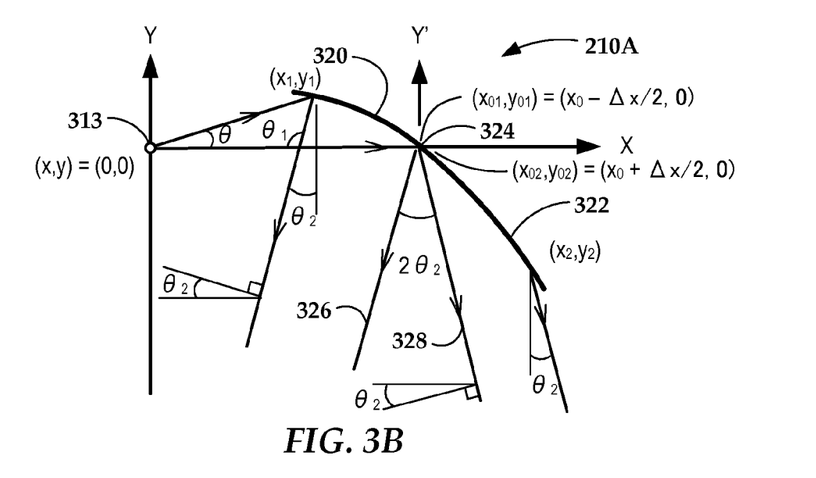

An example configuration of collimating mirror 210A according to an example embodiment is shown in FIG. 3B. For purposes of convenience in developing the formulas below, the collimating mirror 210A is shown reversed about the y-axis relative to source point 313 compared to mirror 210 in FIG. 3A. It will be appreciated that the embodiments can be implemented using either orientation of the mirrors 210 and 210A relative to source point 313.

In the diagram of FIG. 3B, the collimating mirror 210A includes first and second sections 320, 322, each intersecting at points proximate a junction 324 between the two sections 320, 322. The junction 324 lies on the x-axis and point ($x_0$, 0), which is the midpoint of the gap 302 and/or split 308 as shown in FIG. 3A. For purposes of illustration, this point ($x_0$, 0) is used to define a second axis, y' which is normal to the first axis (the x-axis). Upper section 320 intersects near the junction 324 at $x_{01}=x_0-\Delta x/2$, and lower section 322 intersects near the junction 324 at $x_{02}=x_0+\Delta x/2$. While not visible in this example, there is a small horizontal portion at junction 324 having a $\Delta x$ value of $\Delta m_0 \lambda_0/n_{eff}$, which corresponds to m=0 and $\Delta m_0 \neq 0$ in Equation 1.

Each of the first and second sections 320, 322 have geometries configured to receive light from the source point 313 and collimate the generally in the negative y and y' directions to respective first and second sides of the solid immersion focusing mirror and away from the gap (e.g., sides 304, 306 and gap 302 of mirror 212 shown in FIG. 3A). The sections 320, 322 are parabolic sections with a focus at the source point 313 and tilted from the axis of symmetry (y'-axis) by $\theta_2$ and $-\theta_2$, respectively. In cases where $\theta_2$ is small, light reflected off of sections 320, 322 will have substantial components in the negative y/y' directions, and will still be generally directed to the solid immersion mirror which lies directly below collimating mirror 210A along the y' axis. This can be seen in FIG. 4, which shows dimensions of a collimating mirror 210A and solid immersion focusing mirror 212A according to an example arrangement.

Referring back to FIG. 3B, light exits from the source point 313 (x, y)=(0, 0) at an angle $\theta$ where it strikes one of the two sections 320, 322, where it is collimated in two directions, e.g., indicated by rays 326, 328. The shape of the mirror is chosen such that light rays reflected from the upper section 320 will be directed at an angle of $\theta_2$ clockwise relative to the y-axis. Light rays reflected from the lower section 320 will be directed at an angle of $\theta_2$ counterclockwise relative to the y-axis. The mirror shape is determined by Equations 2-4 below, where $\theta_0=\theta_2>0$, $x_{00}=x_{01}$ for the upper sector 320, and $\theta_0=-\theta_2<0$, $x_{00}=x_{02}$ for the lower sector 322.

$$y = \frac{\cos\theta_0(x\sin\theta_0 - x_0') + \sqrt{x_0'(x_0' - 2x\sin\theta_0)}}{\sin^2\theta_0} \quad [2]$$

$$x_0' = (1+\sin\theta_0)x_{00} \quad [3]$$

$$\theta_1 = 90° - \theta_0 \quad [4]$$

A ray at angle $\theta$ from the x-axis will intersect the collimating mirror 210A at (x, y), which are calculated as shown in Equations 5 and 6 below. Note that for Equations 5 and 6, $\theta>0$ for the upper section 320, and $\theta<0$ for the lower section 322.

$$x = \frac{x_0'\cos\theta}{\cos^2(\theta+\theta_0)}[1-\sin(\theta+\theta_0)] \quad [5]$$

$$y = x\tan\theta \quad [6]$$

Figure 4:
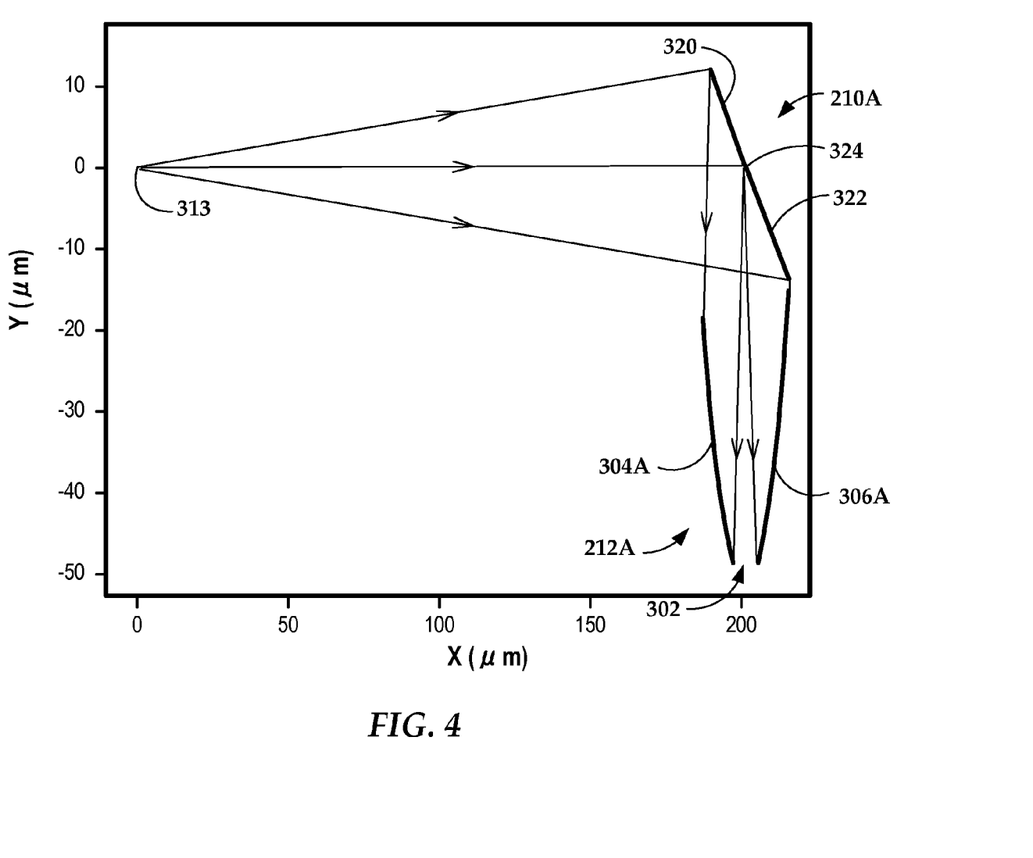
FIG. 4 is a diagram illustrating a collimating mirror and focusing mirror according to an example embodiment.

Because the sections 320, 322 are sections of parabolas with tilted axes of symmetry, the focusing mirror 212 that receives light from the collimating mirror 210A may also need to have tilted sections relative to their axes of symmetry (y-axis) in order to compensate. For example, focusing mirror 212A of FIG. 4, has left sidewall 304A tilted by $\theta_0=\theta_2>0$ and right sidewall 306A is tilted by $\theta_0=-\theta_2<0$. Equation 8 below is the formula for the mirror 212A having tilted sidewalls with geometrical focus at $(x_f, y_f)$, where $x_f=x_0$. The value of $x''_0$ in Equation 8 may be determined by the focal region/point of the mirror 210A and by the angle $\theta_0$. Equation 9 is the tangential slope of the focusing mirror 210A at the bottom, $y=y_f$.

$$y = y_f + \frac{\cos\theta_0[(x-x_f)\sin\theta_0 + x_0''] - \sqrt{x_0''[x_0'' + 2(x-x_f)\sin\theta_0]}}{\sin^2\theta_0} \quad [7]$$

$$x_0'' = \frac{y_f\sin\theta_0\left(\cos\theta_0 - \frac{dy}{dx}\bigg|_{y=y_f}\sin\theta_0\right)}{\sin\theta_0 + \frac{dy}{dx}\bigg|_{y=y_f}\cos\theta_0} \quad [8]$$

$$\frac{dy}{dx}\bigg|_{y=y_f} = \begin{cases} -\tan\left(\frac{\pi}{4}+\frac{\theta_2}{2}\right) & \text{left sidewall} \\ \tan\left(\frac{\pi}{4}+\frac{\theta_2}{2}\right) & \text{right sidewall} \end{cases} \quad [9]$$

The diagram in FIG. 4 shows dimensions of the example mirrors 201A, 212A in an embodiment suitable for an existing slider design. In this example, $x_f=x_0=201$ μm, $\theta_2=4.5°$, $\Delta m_0=0.5$, $\lambda_0=0.83$ μm, and $n_{eff}=1.7857$. The maximum ray angle $\theta$ from the source 313 at (x, y)=(0, 0) is 3.6°. As this diagram illustrates, the light from top collimating section 320 is reflected to left focusing sidewall 304A, and the light from bottom collimating section 322 is directed to right focusing sidewall 306A. The sidewalls 304A, 306A are rotated by $\theta_2$ clockwise and counterclockwise, respectively, which ensures the light strikes the NFT (not shown) at the desired orientation.

Figure 5:
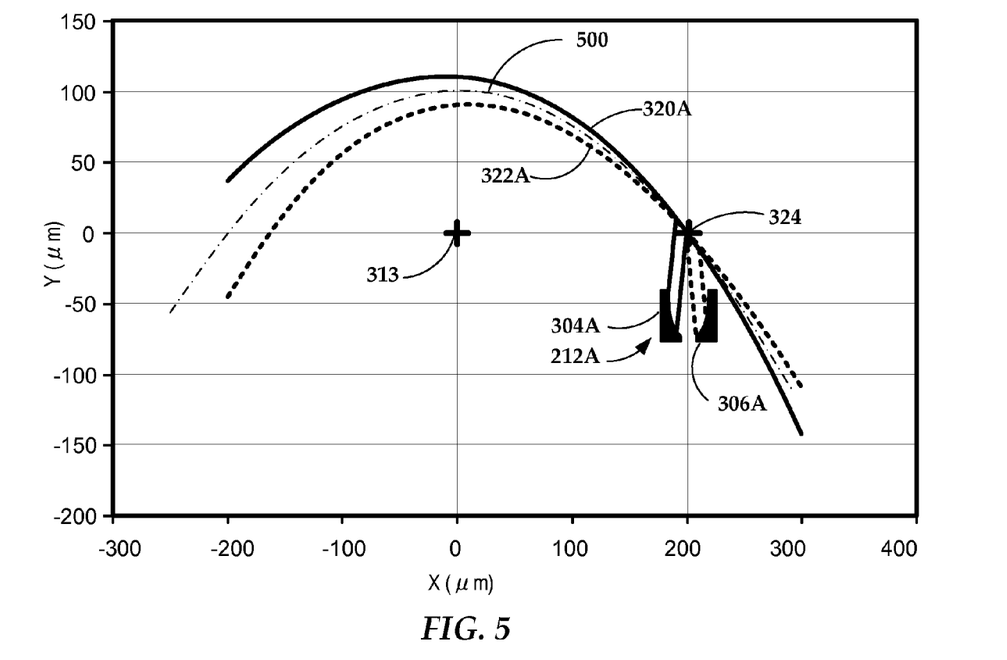
FIG. 5 is a diagram illustrating parabolic curves used to define collimating mirror shown in FIG. 4.

To better illustrate the relative curvature of the collimating mirror sections 320, 322, FIG. 5 is a diagram showing an extension of the curves used to form the sections of the mirror 210A embodiment shown in FIG. 4. In FIG. 5, parabolas 320A and 322A plotted for Equations 2 and 3 using values of sections 320, 322 in FIG. 4. As with FIG. 4, the source point 313 in FIG. 5 is at (x,y)=(0,0). It can be seen that these parabolas 320A, 322A have a focus at the source point 313 and respective axes of symmetry tilted at respective negative (clockwise) and positive (counterclockwise) and angles relative to the y-axis. For purposes of comparison, curve 500 is a parabola with focus at point 313 and no tilting angle about its axis of symmetry, which is the y-axis in this case. Curve 500 corresponds to the equation $y=-x^2/402+100.5$, where x and y are expressed in μm.

It will be appreciated many variations of collimating and focusing mirrors may be possible in view of the above teachings. For example, the two sections of the collimating mirror (and corresponding sidewalls of the focusing mirror) may be rotated by different angles, e.g., $\theta_{21}$ and $-\theta_{22}$ where $\theta_{21}\neq\theta_{22}$. This may also involve an asymmetric rotation of the sidewalls of the focusing mirrors by similar angles. Also as noted above, the dimension ($\Delta x$) of the split region along the x-axis may be zero, or may be non-zero but less than a wavelength of the light divided by an effective waveguide mode index ($\lambda_0/n_{eff}$).

Figure 6:
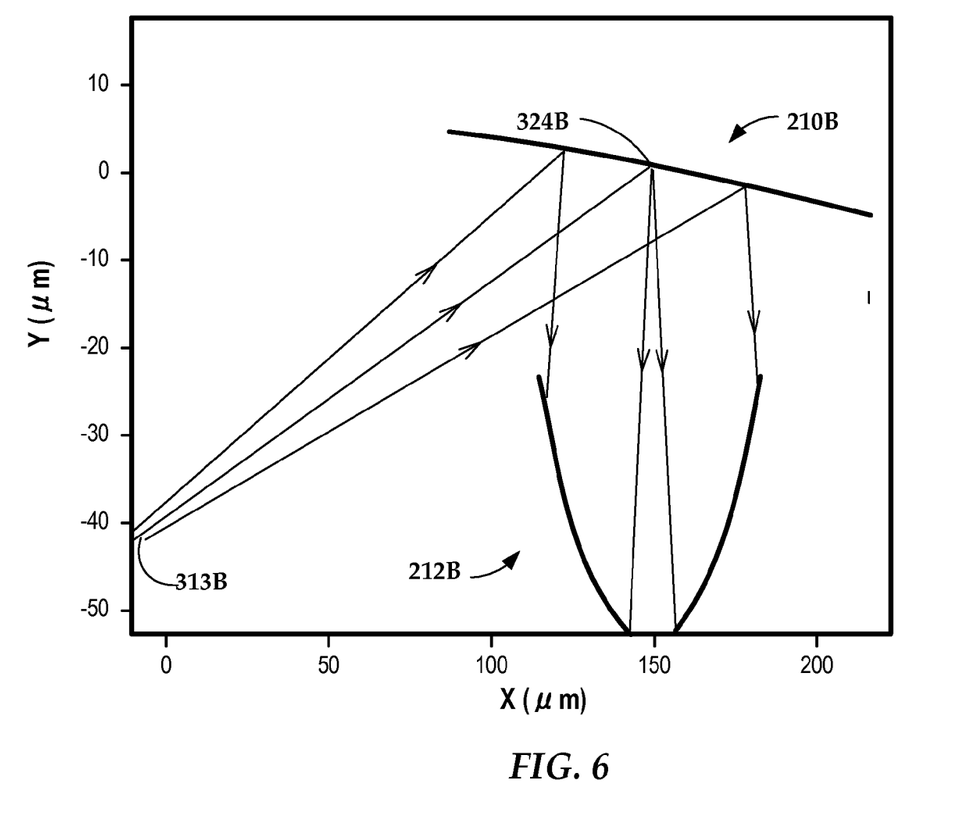
FIG. 6 is a diagram illustrating a collimating mirror and focusing mirror according to another example embodiment.

Another variation of collimating and focusing mirrors is shown in the diagram of FIG. 6. This arrangement includes collimating mirror 210B and focusing mirror 212B similar to collimating and focusing mirrors described above. In this example, however, a source of the light 313B (e.g., a parabolic mirror) is not located at the same y-location as a junction point 324B of the collimating mirror 210B. The location and geometry of at least the collimating mirror 210B (and optionally the focusing mirror) can be adjusted to account for this relative orientation between the light source 313B and the collimating mirror 210B.

Figure 7:
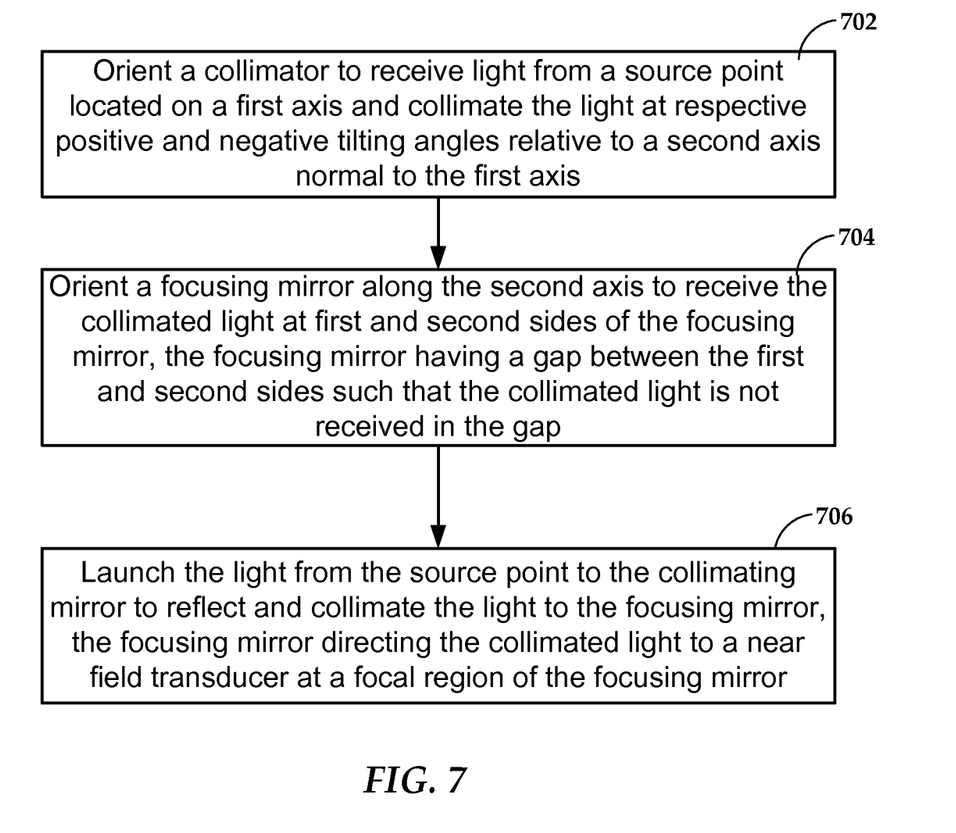
FIG. 7 is a flowchart illustrating a procedure according to an example embodiment.

In reference now to FIG. 7, a flowchart illustrates a method according to an example embodiment. The method involves orienting 702 a collimator to receive light from a source point located on a first axis and collimate the light at respective positive and negative tilting angles relative to a second axis normal to the first axis. The collimator may include first and second parabolic sections, each of the first and second parabolic sections having a focus at the source point and an axis of symmetry tilted at the respective positive and negative tilting angles relative to the first axis. In such a case, the focusing mirror may include first and second parabolic sides facing the second axis, which may be tilted by the respective positive and negative tilting angles to direct the collimated light to a focal point of the focusing mirror. In another variation, the collimator may include a split region parallel with the first axis, a dimension (Δx) of the split region along the first axis being less than a wavelength of the light divided by an effective waveguide mode index ($\lambda_0/n_{eff}$).

A focusing mirror is oriented 704 along the second axis to receive the collimated light at first and second sides of the focusing mirror. The focusing mirror has a gap between the first and second sides, and the collimated light is not received in the gap (in the sense of geometrical optics). The light is launched 706 from the source point to the collimating mirror to collimate the light, such that the focusing mirror directs the collimated light to a near field transducer at a focal region of the focusing mirror.

Figure 8:
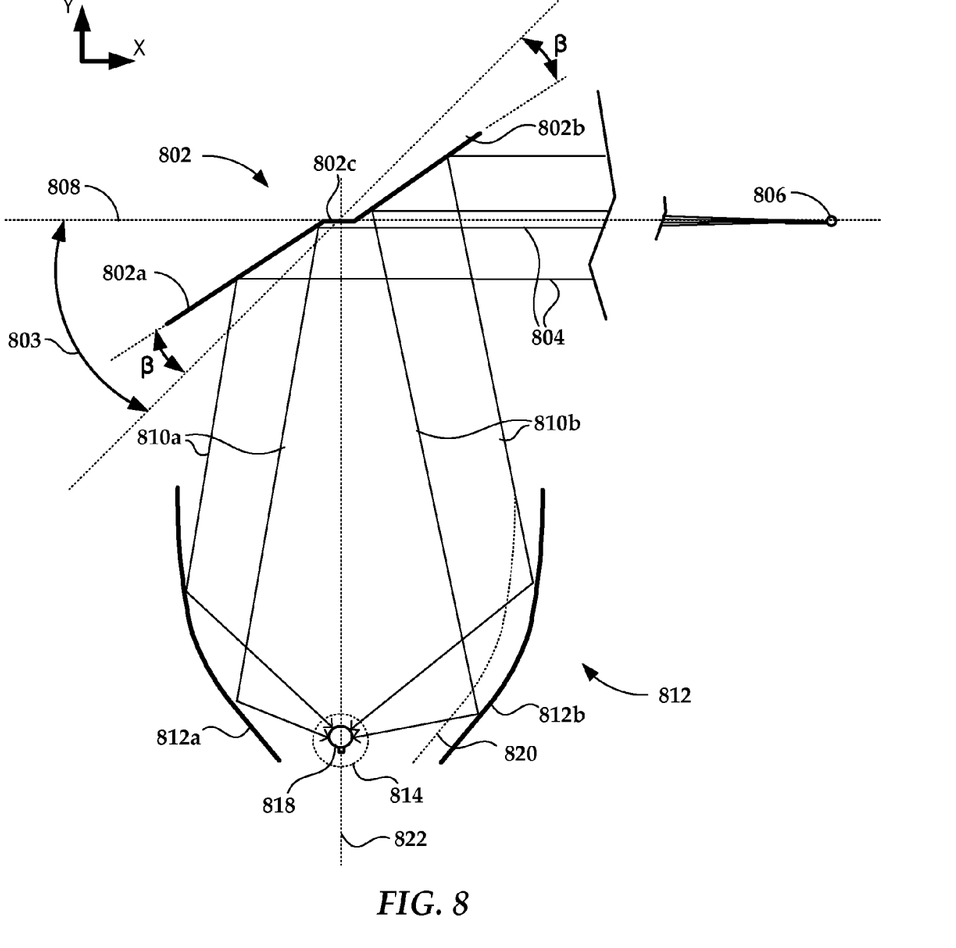
FIG. 8 is a diagram illustrating a mirror arrangement according to an example embodiment.

In reference now to FIG. 8, a block diagram illustrates a mirror arrangement according to another example embodiment. A diagonal mirror 802 is configured to receive light 804 from a source point 806 located on a first axis 808 (e.g., an axis parallel to the x-direction). The diagonal mirror 802 includes non-parallel, first and second mirror portions 802a, 802b joined by a split region 802c that is parallel with the first axis 808. The split region 802c introduces a phase shift (e.g., a π-angle phase shift) between first and second portions of light 810a, 810b reflected by the first and second portions 802a, 802b. The first and second portions of light 810a, 810b are reflected by approximately 90 degrees, as indicated by 45-degree nominal angle 803 relative to the first axis 808.

The first and second portions 802a, 802b of mirror 802 are canted relative to one another by an angle β. Section 802a is canted +β relative to the 45-degree nominal angle 803, and section 802b is canted -β from the nominal angle 803. It will be understood that β may be zero, and the sections 802a, 802b may be canted by different angles, e.g., $β_1$ and $β_2$. The canting angles cause respective portions of light 810a, 810b to be directed to respective sections 812a, 812b of a parabolic mirror 812 without causing light to directly enter a focal region 814 between the sections 812a, 812b.

The first and second sections 812a, 812b are configured to receive the respective first and second portions of light 810a, 810b and direct the light to a focal region 814. The first and second sections 812a, 812b may be tilted by canting angle β in negative and positive directions to compensate for tilting of the diagonal mirror 802. An NFT 818 is disposed at the focal region 814 and reaches surface plasmon resonance in response to incident light reflected by first and second sections 812a, 812b.

The split region 802c causes a beam shadow along the along centerline 822 of the focal region 814 which improves the coherent beam power delivered to the NFT transducer 818. The attenuation of the beam along the centerline 822 (which is not reflected) also reduces the amount of beam interference effects at the NFT 818, thereby reducing beam variation. The net field at the focal region 814 is generally a cross-track-direction field at the focal point, which energizes an NFT plasmonic device. The initial phase shift at the split diagonal mirror 802 gives a zero net field along the centerline 822 which intersects the NFT 818. This may reduce or eliminate interference fields which may cause unpredictable shifts in focus peak field amplitude, position, and profile (FWHM), etc.

The first and second sections 812a, 812b are asymmetrically disposed relative to the focal region 814 so that the phase shift introduced by split region 802c of the diagonal mirror 802 is adjusted. This is indicated by dashed line 820, which indicates a symmetrical projection of first section 812a about the focal region centerline 822. The distance between the dashed line 820 and location of second section 812b is an example of asymmetry about the focal region 814, which is shifted along the x-direction. Other asymmetries may be introduced between sections 812a, 812b, such as a shift along the y-direction or a rotational asymmetry. It should be noted that the asymmetry, as well as other geometric features such as canting angle β, may be significantly exaggerated in FIG. 8 for purposes of illustration.

The first and second sections 812a, 812b may be asymmetrically disposed relative to the focal region 814 so that there is no phase shift between the first and second portions of light 810a, 810b at the focal region 818. There may be a desire to have a selectable amount of phase shift, e.g., some NFT designs may perform better with incident light being phase-shifted between the left and right side of the NFT. For example, the illustrated NFT 818 is a disc/peg design, and this may benefit from having a π-angle phase shift on either side. Other NFT designs, such as pins or gap-waveguide NFT may perform best with zero or close to zero phase shift on either side.

The diagonal mirror 802 and the parabolic mirror 812 may both be configured as planar mirrors. At least one of the diagonal mirror 802 and the parabolic mirror 812 may be configured as a solid immersion mirror. The mirror arrangement may introduce phase shifts at both the diagonal mirror 802 and the parabolic reflector 812. This phase shifts may be of same or different amounts.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
   a planar collimator comprising first and second sections each intersecting at a junction between a first axis and a second axis normal to the first axis, each of the first and second sections having geometries configured to receive light from a source point located on the first axis and collimate the light at respective positive and negative tilting angles relative to the second axis, towards respective first and second sides of a focusing mirror and away from a gap between the first and second sides of the focusing mirror.

2. The apparatus of claim 1, wherein the first and second sections comprise first and second parabolic sections.

3. The apparatus of claim 2, wherein each of the first and second parabolic sections have a focus at the source point and an axis of symmetry tilted at the respective positive and negative tilting angles relative to the first axis.

4. The apparatus of claim 3, wherein the focusing mirror comprises first and second parabolic sides facing the second axis, and are tilted by the respective positive and negative tilting angles to direct the collimated light to a focal point of the focusing mirror.

5. The apparatus of claim 1, wherein the focusing mirror focuses the collimated light on a near field transducer located proximate the gap.

6. The apparatus of claim 1, wherein the planar collimator and the focusing mirror are co-planar.

7. The apparatus of claim 1, wherein the junction comprises a split region parallel with the first axis, wherein a dimension ($\Delta x$) of the split region along the first axis is less than a wavelength of the light divided by an effective waveguide mode index ($\lambda_0/n_{eff}$).

8. An apparatus comprising:
an optical guide delivering energy to a source point along a first axis;
a collimator receiving the energy from the source point, the collimator comprising first and second parabolic sections each intersecting at a junction between the first axis and a second axis normal to the first axis, each of the first and second parabolic sections having a focus at the source point and an axis of symmetry tilted at respective positive and negative tilting angles relative to the first axis; and
a focusing mirror comprising first and second parabolic sides facing the second axis and a gap between the first and second parabolic sides, wherein the first and second parabolic sections of the collimator direct the energy to the first and second parabolic sides without directing energy to the gap.

9. The apparatus of claim 8, wherein the first and second parabolic sides of the focusing mirror are tilted by the respective positive and negative tilting angles to direct the energy to a focal point of the focusing mirror.

10. The apparatus of claim 9, further comprising a near field transducer located at the focal point of the focusing mirror and proximate the gap.

11. The apparatus of claim 8, wherein the focusing mirror comprises a solid immersion mirror.

12. The apparatus of claim 8, wherein the collimator is achromatic.

13. The apparatus of claim 8, wherein the positive and negative tilting angles have the same magnitude, and wherein the second axis is an axis of symmetry of the focusing mirror.

14. The apparatus of claim 8, wherein the collimator and focusing mirror are planar and disposed on a common plane.

15. The apparatus of claim 8, wherein the junction comprises a split region parallel with the first axis, wherein a dimension ($\Delta x$) of the split region along the first axis is less than a wavelength of the energy divided by an effective waveguide mode index ($\lambda_0/n_{eff}$).

16. An apparatus comprising:
a diagonal mirror configured to receive light from a source point located on a first axis, the diagonal mirror comprising non-parallel, first and second mirror portions joined by a split region that is parallel with the first axis, wherein the split region introduces a phase shift between first and second portions of light reflected by the first and second portions;
a parabolic mirror comprising first and second sections configured to receive the respective first and second portions of light and direct the light to a focal region, wherein the first and second portions are non-symmetrically disposed relative to the focal region to adjust the phase shift introduced by split region of the diagonal mirror.

17. The apparatus of claim 16, wherein the first and second portions are non-symmetrically disposed relative to the focal region so that there is no phase shift between the first and second portions of light at the focal region.

18. The apparatus of claim 16, wherein the phase shift comprises a π-angle phase shift.

19. The apparatus of claim 16, wherein the diagonal mirror and the parabolic mirror comprise planar mirrors.

20. The apparatus of claim 16, wherein at least one of the diagonal mirror and the parabolic mirror comprise a solid immersion mirror.

\* \* \* \* \*